United States Patent
Son et al.

(10) Patent No.: US 11,352,045 B2
(45) Date of Patent: Jun. 7, 2022

(54) VARIABLE STEERING WHEEL DAMPER USING ELECTROMAGNET

(71) Applicants: Hyundai Motor Company, Seoul (KR); Kia Motors Corporation, Seoul (KR)

(72) Inventors: Byung-Chul Son, Hwaseong-Si (KR); Dong-Gwan Roh, Hwaseong-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 186 days.

(21) Appl. No.: 16/857,946

(22) Filed: Apr. 24, 2020

(65) Prior Publication Data

US 2021/0061338 A1   Mar. 4, 2021

(30) Foreign Application Priority Data

Aug. 30, 2019   (KR) .......................... 10-2019-0107772

(51) Int. Cl.
| | |
|---|---|
| *F16F 15/02* | (2006.01) |
| *B62D 1/11* | (2006.01) |
| *B62D 1/10* | (2006.01) |
| *F16F 7/10* | (2006.01) |
| *F16F 7/108* | (2006.01) |

(52) U.S. Cl.
CPC .................. *B62D 1/11* (2013.01); *B62D 1/10* (2013.01); *F16F 7/108* (2013.01); *F16F 7/1011* (2013.01); *F16F 2222/08* (2013.01); *F16F 2228/04* (2013.01); *F16F 2228/066* (2013.01); *F16F 2230/18* (2013.01)

(58) Field of Classification Search
CPC ........ F16F 1/3615; F16F 7/1011; F16F 15/02; B62D 1/11
USPC .......... 188/267.1, 267.2; 267/140.14, 140.15
See application file for complete search history.

(56) References Cited

U.S. PATENT DOCUMENTS

| | | | |
|---|---|---|---|
| 10,544,848 B2* | 1/2020 | Inoue | F16F 1/3615 |
| 2005/0011710 A1* | 1/2005 | Hitchcock | F16F 1/3615 |
| | | | 188/267.2 |

FOREIGN PATENT DOCUMENTS

| | | |
|---|---|---|
| KR | 10-2009-0029400 A | 3/2009 |
| KR | 10-2014-0042162 A | 4/2014 |
| KR | 10-2017-0069743 A | 6/2017 |

\* cited by examiner

*Primary Examiner* — Christopher P Schwartz
(74) *Attorney, Agent, or Firm* — Morgan, Lewis & Bockius LLP

(57) ABSTRACT

A steering wheel damper may include a plate fastened to a hub of a steering wheel; one or more posts each having one side fixed to a surface of the plate and the other side extending perpendicular to the surface of the plate; a mass body spaced from the plate, attached to the other side of the post, supported by the posts, and having upper and lower portions configured as magnet bodies having different polarities; and an electromagnet made by winding a coil around a core fixed to the surface of the plate.

3 Claims, 4 Drawing Sheets

VARIABLE STEERING WHEEL DAMPER USING ELECTROMAGNET

CROSS-REFERENCE TO RELATED APPLICATIONS

The present application claims priority to Korean Patent Application No. 10-2019-0107772, filed on Aug. 30, 2019, the entire contents of which is incorporated herein for all purposes by this reference.

BACKGROUND OF THE INVENTION

Field of the Invention

The present invention relates to a steering wheel damper, and more particularly, to a damper including: a plate fastened to a hub of a steering wheel; one or more posts each having one side fixed to a surface of the plate and the other side extending perpendicular to the surface of the plate; a mass body spaced from the plate, attached to the other side of the post, supported by the posts, and having upper and lower portions configured as magnet bodies having different polarities; and an electromagnet made by winding a coil around a core fixed to the surface of the plate.

Description of Related Art

In general, a steering wheel for steering a vehicle is mounted in a driver seat of the vehicle.

A steering shaft and a steering column are coupled to the steering wheel to transmit an operating force of the steering wheel. A steering gear is mounted to convert a rotational force of the steering wheel transmitted through the steering shaft to change directions of vehicle wheels, such that when a driver rotates the steering wheel, the rotational force is transmitted to the steering gear, and the directions of the vehicle wheels are changed.

The steering wheel includes a circular rim configured to be held by a driver, a hub mounted at a center portion of the steering wheel, and a spoke configured to connect the hub and the rim, and an airbag for a driver and a horn are embedded in the hub.

In the instant case, a damper for reducing vibration is mounted in the hub of the steering wheel to prevent vibration of the steering wheel caused when the vehicle travels.

Typically, the steering wheel damper includes a base plate fastened to the hub, a post made of rubber and mounted on the base plate, and a mass body spaced from the base plate and supported by the post.

However, the steering wheel damper has a natural frequency to maximally reduce the vibration of the steering wheel, and the natural frequency is tuned by adjusting variable values of design elements such as rigidity, hardness, and mass of the post and the mass body which are constituent elements of the damper.

The tuning of the natural frequency of the damper is determined based on vibration properties of the steering wheel, and the natural frequency of the damper is fixed in accordance with the variable values of the design elements of the post or the mass body. Typically, the natural frequency is fixed in accordance with the vibration properties of the steering wheel at a telescopic-in position, a telescopic middle position, and a telescopic-out position which are three positions of the steering wheel under an idle state of the engine.

However, there is still a limitation in reducing various types of traveling vibration transmitted to the steering wheel, for example, overall vibration transmitted from traveling vibration such as vibration occurring when the vehicle creeps (the vehicle slowly travels forward without pressing an accelerator pedal when a gear shifting stage is set to a driving stage in an automatic transmission vehicle), vibration occurring when the vehicle accelerates, and vibration occurring when the clutch is locked upwards while the vehicle travels.

Meanwhile, as related arts related to the steering wheel damper of the vehicle, technologies of Korean Patent Application Laid-Open Nos. 10-2009-0029400, 10-2014-0042162, and 10-2017-0069743 are publicly known.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a steering wheel damper in which a length of a post made of rubber material is changed by an electromagnet, and rigidity of the post of the steering wheel damper is changed, such that vibration transmitted from various types of traveling vibration may be reduced.

Various aspects of the present invention are directed to providing a variable steering wheel damper using an electromagnet, the variable steering wheel damper including: a plate fastened to a hub of a steering wheel; one or more posts each having one side fixed to a surface of the plate and the other side extending perpendicular to the surface of the plate; a mass body configured to be spaced from the plate, attached to the other side of the post, supported by the posts, and having upper and lower portions configured as magnet bodies having different polarities; and an electromagnet made by winding a coil around a core fixed to the surface of the plate.

According to the variable steering wheel damper using the electromagnet according to an exemplary embodiment of the present invention configured as described above, the natural frequency of the damper may be changed by changing the rigidity of the post of the steering wheel damper by changing the length of the post made of rubber by use of the electromagnet. As a result, the noise, vibration, and harshness (NVH) (noise, vibration, and noise and vibration caused by external impact) performance of the vehicle may be improved by reducing overall vibration transmitted from various types of traveling vibration in the vehicle, such that ride comfort may be improved and the marketability may be improved.

The steering wheel damper according to an exemplary embodiment of the present invention has a comparatively simple structure, such that costs and weights may be reduced and fuel economy may be improved.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 4A, FIG. 4B, and FIG. 4C are views exemplarily illustrating operating states of the steering wheel damper according to an exemplary embodiment of the present invention, in which FIG. 4A is a view exemplarily illustrating an initial operating state, FIG. 4B is a view exemplarily illustrating an operating state when a first current is applied, and FIG. 4C is a view exemplarily illustrating an operating state when a second current is applied.

Figure 1A:
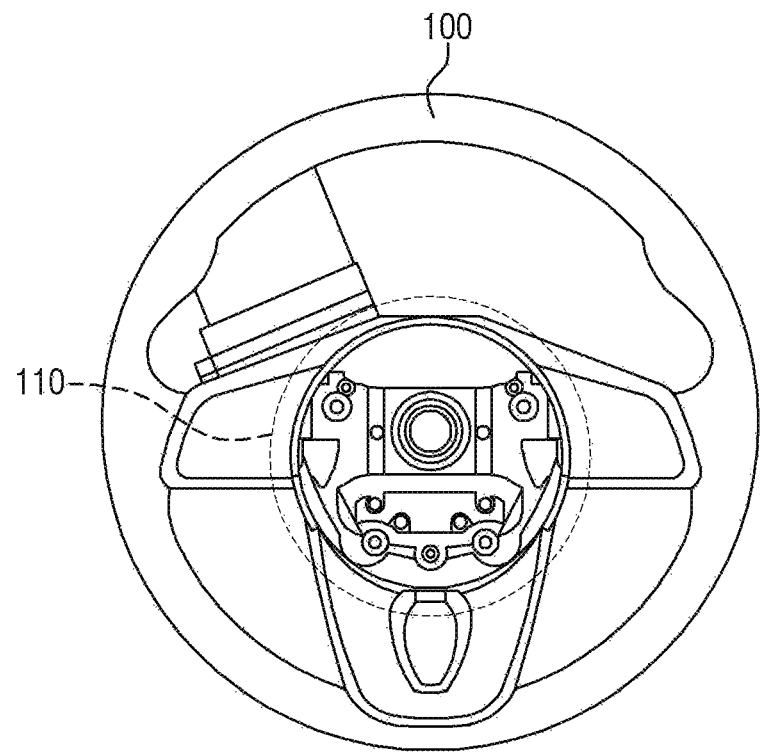
FIG. 1A and FIG. 1B are perspective views exemplarily illustrating a steering wheel and a steering wheel damper according to an exemplary embodiment of the present invention, mounted in the steering wheel.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a configuration and an operation of a variable steering wheel damper using an electromagnet according to an exemplary embodiment of the present invention will be described with reference to the drawings.

However, the included drawings are provided as an example for fully transferring the spirit of the present invention to those skilled in the art. Therefore, the present invention is not limited to the drawings included below and may be specified as other aspects.

Unless otherwise defined, the terminologies used in the specification of the present invention have the meanings that a person with ordinary skill in the field of the present invention to which an exemplary embodiment of the present invention pertains typically understands, and in the following description and the accompanying drawings, a detailed description of publicly known functions and configurations will be omitted to avoid unnecessarily obscuring the subject matter of the present invention.

Figure 1B:
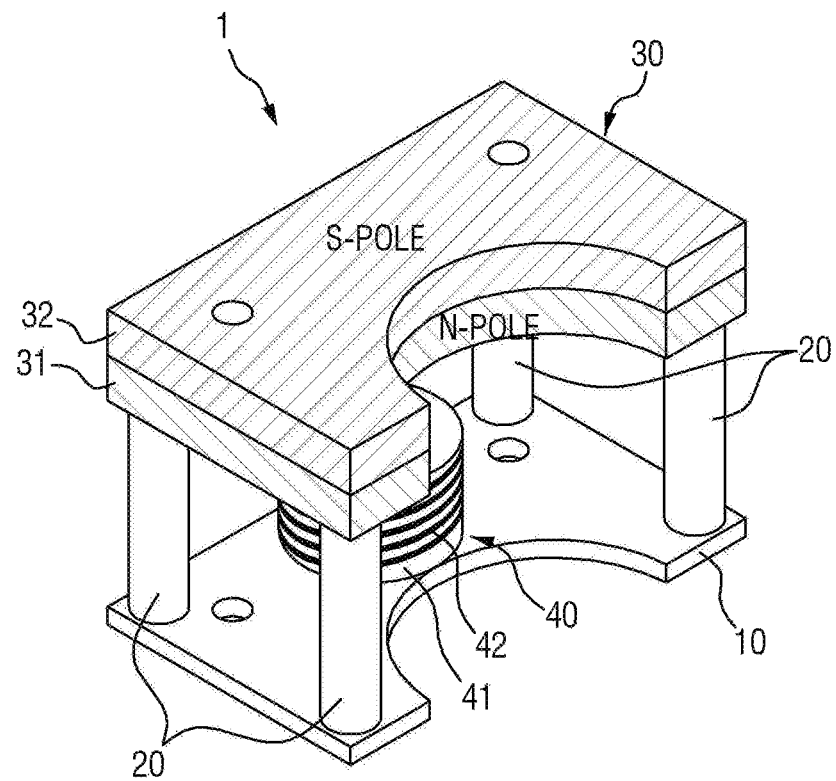
Figure 2:
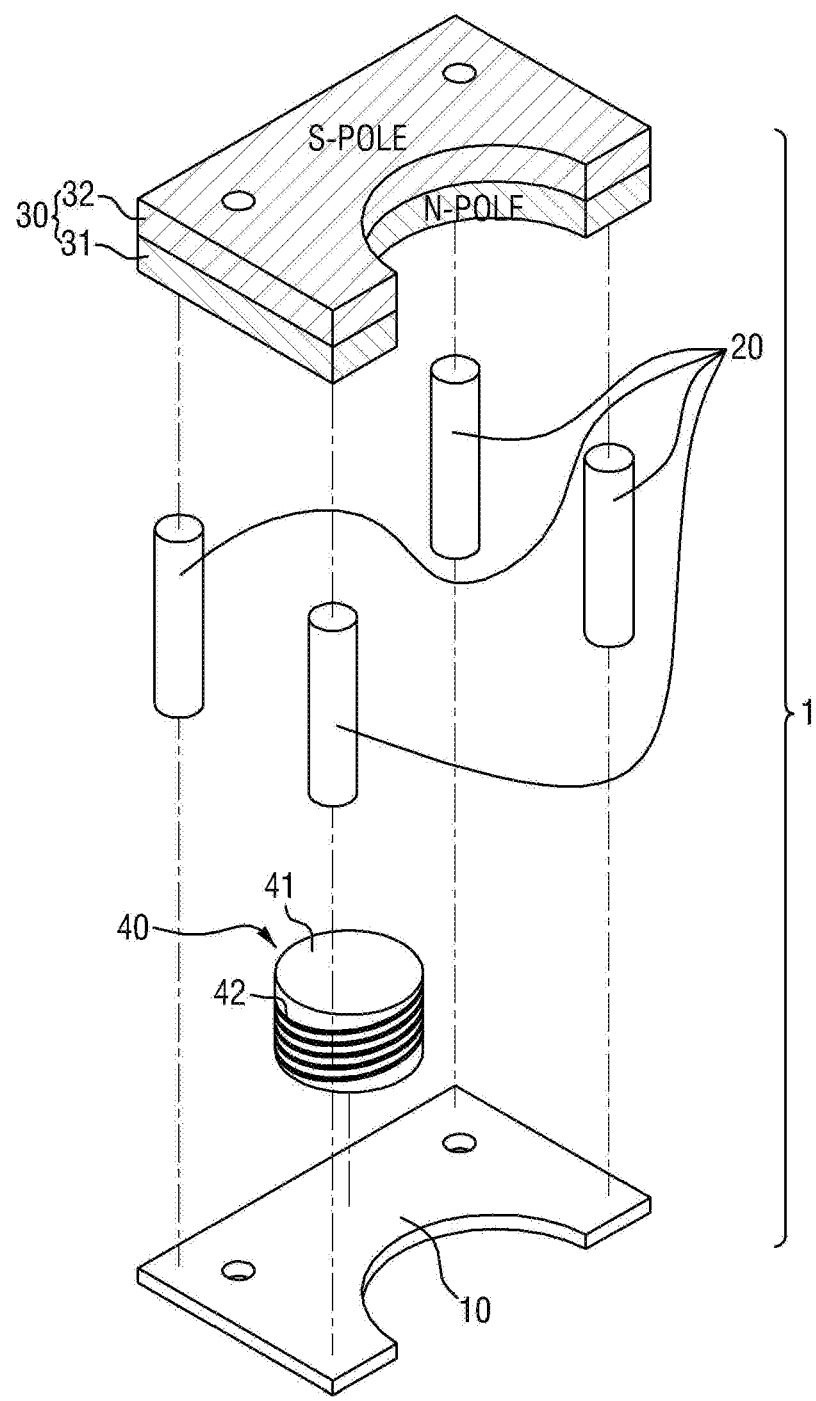
FIG. 2 is an exploded perspective view exemplarily illustrating the steering wheel damper according to an exemplary embodiment of the present invention.

FIG. 1 is a perspective view exemplarily illustrating a steering wheel damper according to an exemplary embodiment of the present invention, and FIG. 2 is an exploded perspective view exemplarily illustrating a steering wheel damper according to an exemplary embodiment of the present invention.

Referring to the respective drawings, a steering wheel damper 1 (hereinafter, abbreviated to a 'damper') according to an exemplary embodiment of the present invention includes a flat-plate shaped plate 10 fastened to a hub 110 of a steering wheel 100, one or more posts 20 each having one side fixed to a surface of the plate 10 and the other side extending perpendicular to the surface of the plate 10, a mass body 30 configured to be spaced from the plate 10, supported by the posts 20 by being attached to the other side of the posts 20, and having upper and lower portions configured as magnet bodies having different polarities, and an electromagnet 40 made by winding a coil 42 around a core 41 fixed to the surface of the plate 10.

A material of the post 20 is rubber. As illustrated, in the exemplary embodiment of the present invention, there are a total of four posts 20 mounted on the plate 10, one post 20 for each corner of the plate 10.

Furthermore, the core has a cylindrical body. The coil 42 is wound several times around an external circumferential surface of the core, and the coil 42 includes an electric conductor so that a current may be applied to the coil 42.

The mass body 30 according to the exemplary embodiment of the present invention has a flat-plate shape. The lower portion is an N-pole body 31 which is a magnet body with the N-polarity, and the upper portion is an S-pole body 32 which is a magnet body with the S-polarity.

Therefore, in the damper 1 according to an exemplary embodiment of the present invention configured as described above, when the current is applied to the coil 42 of the electromagnet 40, a magnetic field is generated at an upper side of the core 41 by the electromagnet 40 in the direction in which the current is applied. A repulsive force or attractive force is exerted on the mass body 30 by the generated magnetic field, and the mass body 30 is pushed by the repulsive force or pulled by the attractive force, such that the natural frequency of the damper is adjusted as rubber rigidity of the posts 20 for supporting the mass body 30 is changed.

Here, the natural frequency of the damper may be obtained based on the publicly known Expression 1 used to determine frequency properties of an object.

$$f \propto \frac{1}{2\pi}\sqrt{\frac{k}{m}} \qquad \text{(Expression 1)}$$

f: frequency
k: rubber rigidity of damper
m: mass of damper

That is, the natural frequency of the damper is proportional to the rubber rigidity k of the damper and inversely proportional to the mass m. The natural frequency of the damper increases as the rubber rigidity k increases while the mass m of the damper remains the same, and the natural frequency of the damper decreases as the rubber rigidity k decreases while the mass m of the damper remains the same.

Therefore, in the case of the damper according to an exemplary embodiment of the present invention, when the current is applied to the coil 42 of the electromagnet 40, the repulsive force or attractive force is exerted on the mass body 30, which has the upper and lower portions configured as magnet bodies having different polarities, by the magnetic field generated at the upper side of the electromagnet 40 as described above, such that the mass body 30 is pushed in the direction away from the electromagnet 40 or pulled in the direction toward the electromagnet 40. As a result, the rubber rigidity k of the posts 20, which are made of rubber and mounted on the plate 10 to support the mass body 30, is changed, and the natural frequency of the damper 1 based on Expression 1 is changed depending on the change amount in changed rubber rigidity.

In the instant case, in the case of the damper according to an exemplary embodiment of the present invention, rotation speed (RPM) values of an engine under various conditions are stored in a controller such as an electronic control unit (ECU) of a vehicle in which the damper is mounted. The examples of the RPM values of the engine under various conditions may include an RPM value of the engine when the vehicle creeps, an RPM value of the engine when an air conditioner operates in the vehicle, an RPM value of the engine when the vehicle accelerates, and an RPM value of the engine when a clutch is locked up while the vehicle travels. Furthermore, when an RPM value of the engine corresponds to the RPM values of the engine under the various conditions, the ECU may apply the amount of current, predetermined by the ECU, to the electromagnet 40.

Meanwhile, a magnitude of the magnetic field generated at the upper side of the electromagnet 40 is changed depending on a material, a length, and an area of the core 41, a thickness of the coil 42, and the number of windings of the coil 42, and the magnitude of the magnetic field is changed in proportion to the amount of current applied to the coil 42. As a result, it is possible to adjust the natural frequency of the damper according to an exemplary embodiment of the present invention by changing variables of the design elements of the electromagnet 40.

Next, an operation of the steering wheel damper according to an exemplary embodiment of the present invention configured as described above will be described.

Figure 3:
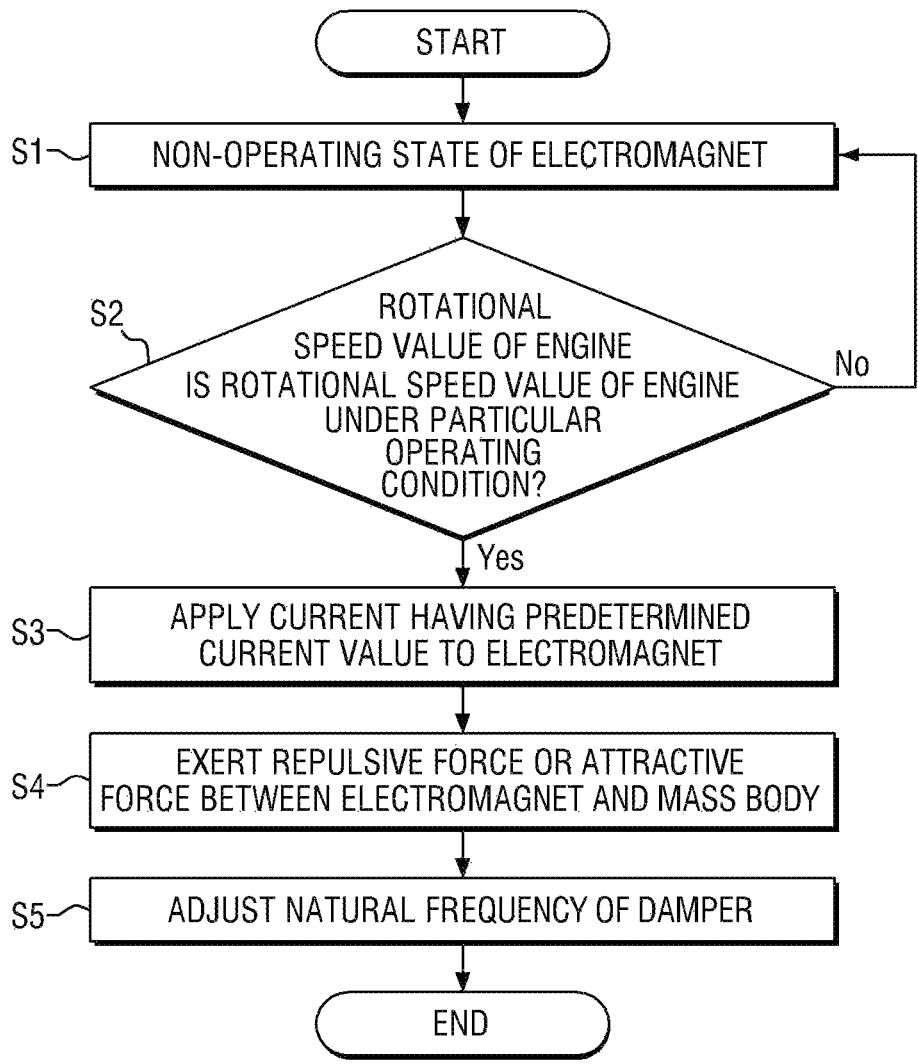
FIG. 3 is a flowchart for controlling the steering wheel damper according to an exemplary embodiment of the present invention.
Figure 4A:
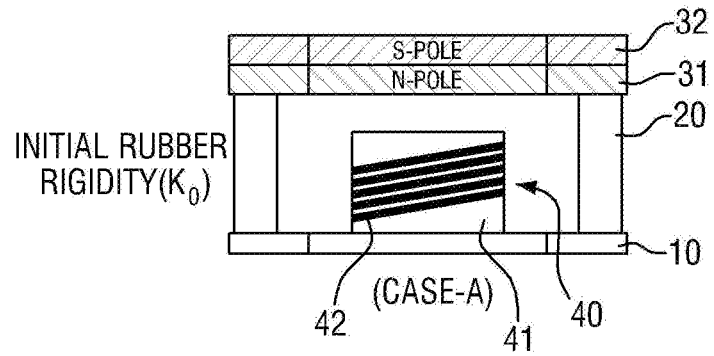
Figure 4B:
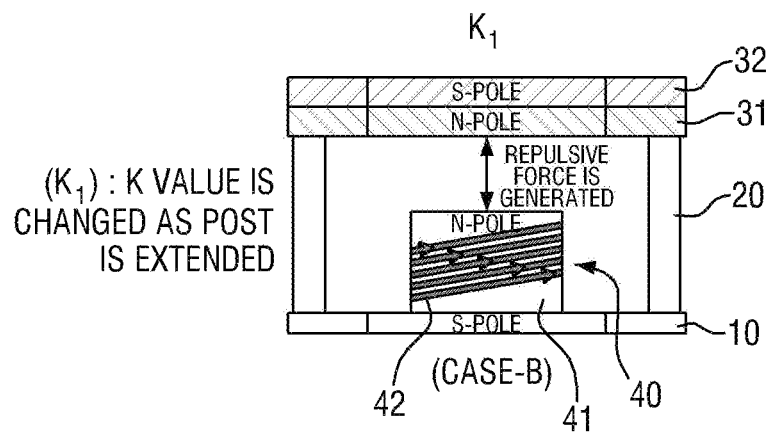
Figure 4C:
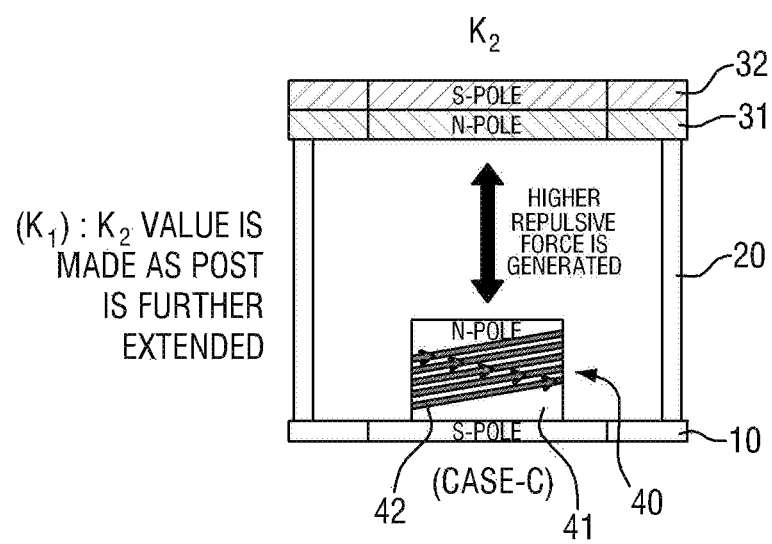

FIG. 3 is a flowchart for controlling the steering wheel damper according to an exemplary embodiment of the present invention, and FIG. 4 is a view exemplarily illustrating operating states of the steering wheel damper according to an exemplary embodiment of the present invention, in which FIG. 4A is a view exemplarily illustrating an initial operating state, FIG. 4B is a view exemplarily illustrating an operating state when a first current is applied, and FIG. 4C is a view exemplarily illustrating an operating state when a second current is applied.

First, referring to FIG. 3, the steering wheel damper according to an exemplary embodiment of the present invention includes the ECU which stores an RPM value of the engine under a particular operation condition of the engine and applies, to the electromagnet 40, a predetermined amount of current corresponding to the stored RPM value under the particular operation condition of the engine.

The ECU detects the RPM value of the engine when the electromagnet 40 is not in the operating state (S1), and the ECU determines whether the detected RPM value of the engine corresponds to the stored RPM value under the particular operation condition (S2). When the detected RPM value of the engine corresponds to the stored RPM value under the particular operation condition, the ECU applies the amount of current, predetermined by the ECU, to the electromagnet 40 (S3).

Accordingly, the magnetic field is generated at the upper side of the electromagnet 40 by the current applied to the electromagnet 40, such that the repulsive force or attractive force is exerted on the mass body 30 (S4). The rubber rigidity k of the posts 20 is changed depending on the exerted repulsive force or attractive force, and the natural frequency of the steering wheel damper is adjusted in accordance with the change amount in changed rubber rigidity (S5).

Referring to FIG. 4, FIG. 4A is a view exemplarily illustrating the initial operating state of the damper (CASE-A). The damper according to an exemplary embodiment of the present invention is set to have a predetermined natural frequency f0. The damper has the initial rubber rigidity k0 when a length of the post 20 is not changed.

In the instant case, the natural frequency f0 may be, for example, a natural frequency for attenuating vibration transmitted to the steering wheel under an idle state of the engine at three positions of the steering wheel, that is, a telescopic in position, a telescopic middle position, and a telescopic out position. Alternatively, the natural frequency f0 may be a natural frequency for attenuating vibration transmitted to the steering wheel when an air conditioner of the vehicle operates under the idle state of the engine.

FIG. 4B is a view exemplarily illustrating the operating state of the damper when the first current having a predetermined amount is applied to the coil 42 of the electromagnet 40 (CASE-B). In the operating state of the damper, the damper has a first tuned natural frequency f1 tuned to attenuate various types of traveling vibration transmitted to the steering wheel of the vehicle, for example, various types of vibration transmitted from traveling vibration such as vibration occurring when the vehicle creeps (the vehicle slowly travels forward without pressing an accelerator pedal when a gear shifting stage is set to a driving stage in an automatic transmission vehicle), vibration occurring when the vehicle accelerates, and vibration occurring when the clutch is locked up while the vehicle travels, in addition to vibration set to be attenuated by the predetermined natural frequency f0 of the damper at the initial state.

For example, assuming that the RPM value of the engine under a creeping condition is stored in the ECU of the vehicle to attenuate the vibration occurring when the vehicle creeps, when the vehicle creeps, the ECU of the vehicle applies the first current A1 having a predetermined amount (e.g., 10 A) to the coil 42 of the electromagnet 40 of the steering wheel damper according to an exemplary embodiment of the present invention.

In the instant case, when the first current A1 is applied to the electromagnet 40 in the direction toward the upper side of the core 41, the magnetic field in which the magnetic pole of the electromagnet is the N pole is formed at the upper side of the electromagnet 40, and the magnetic field with the S polarity is formed at the lower side of the electromagnet. In the instant case, because an N-pole portion 31 is formed at the lower side of the mass body 30, a repulsive force is generated between the electromagnet 40 and the mass body 30, such that a force is applied to the mass body 30 in the direction away from the electromagnet 40. As a result, the length of the post 20 is increased, and the rubber rigidity of the post 20 has a value of first rubber rigidity k1 lower than the value of the rubber rigidity k0 in the initial state illustrated in FIG. 3A.

Therefore, according to the above-mentioned Expression 1, as the length of the post 20 increases, the rubber rigidity k decreases, such that the first tuned natural frequency f1 has a value lower than the natural frequency f0 in the state in which the length of the post 20 is not changed.

FIG. 4C is a view exemplarily illustrating the operating state of the damper when the second current A2 having a larger amount than the first current A1 is applied to the coil 42 of the electromagnet 40 (CASE-C). The second current A2 is a current to be applied to the electromagnet 40 so that the damper has a second tuned natural frequency f2 different from the first tuned natural frequency f1.

For example, assuming that an RPM value of the engine under a high-speed traveling condition is stored in the ECU of the vehicle to attenuate vibration occurring when the vehicle travels at a high speed, when the vehicle travels at a high speed, the ECU applies the second current A2 having the predetermined amount (e.g., 15 A) to the coil 42 of the electromagnet 40 according to an exemplary embodiment of the present invention.

In the instant case, when the second current A2 is applied to the electromagnet 40 in the direction toward the upper side of the core 41, the magnetic field in which the magnetic pole of the electromagnet is the N pole is formed at the upper side of the electromagnet 40, and the magnetic field with the S polarity is formed at the lower side of the electromagnet. Because the second current applied to the electromagnet 40 is larger in amount than the first current, the magnetic field, which is greater than the magnetic field formed when the first current is applied, is formed at the upper side of the electromagnet 40, and a higher repulsive force is generated. As a result, the length of the post 20 is increased to a length longer than the length when the first current A1 is applied, such that the rubber rigidity k of the post 20 has a value of second rubber rigidity k2 lower than the value of the first rubber rigidity k1.

Therefore, the second tuned natural frequency f2 has a value lower than the value of the natural frequency f0 and the value of the first tuned natural frequency f1 based on the above-mentioned Expression 1.

Therefore, the natural frequency of the damper may be tuned by changing the length of the post 20 by changing the amount of current to be applied to the electromagnet 40 depending on the RPMs under various vibration conditions in the vehicle. Accordingly, the noise, vibration, and harshness (NVH) (noise, vibration, and noise and vibration caused by external impact) performance of the vehicle may be improved, and marketability may be improved by improving the right comfort of the vehicle.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A damper apparatus mounted in a steering wheel of a vehicle, the damper apparatus comprising:
    a plate fastened to a hub of the steering wheel;
    at least one post made of rubber, wherein each of the at least one post has a first side fixed to a surface of the plate and a second side extending perpendicular to the surface of the plate;
    a mass body spaced from the plate, attached to the second side of the at least one post, supported by the at least one post, and configured as a magnet body; and
    an electromagnet in which a coil is wound around a core fixed to the surface of the plate and disposed between the plate and the mass body,
    wherein the mass body is formed of upper and lower portions configured as magnet bodies disposed to be adjacent to each other and having different polarities, respectively,
    wherein a repulsive force or attractive force is exerted on the mass body while a current is applied to the coil of the electromagnet, the mass body is pushed by the repulsive force or pulled by the attractive force, a rigidity of the rubber of the at least one post for supporting the mass body is changed, and the natural frequency of a damper based on Expression 1 is changed depending on a change amount in changed rigidity of the rubber, and $$f \propto \frac{1}{2\pi}\sqrt{\frac{k}{m}} \qquad \text{(Expression 1)}$$

wherein f is frequency, k is rigidity of the rubber in the damper, and m is mass of the damper.

2. The damper apparatus of claim 1, including:
    a controller configured to store a rotation speed value of an engine under an operation condition of the engine and to apply, to the electromagnet, a predetermined amount of current, which corresponds to the stored rotation speed value under the operation condition of the engine.

3. The damper apparatus of claim 2, wherein the controller is configured to detect the rotation speed value of the engine, and upon determining that the detected rotation speed value of the engine corresponds to the stored rotation speed value under the operation condition, the controller is configured to apply an amount of current, predetermined by the controller, to the electromagnet to change the rigidity of the rubber in the at least one post.

* * * * *